(12) United States Patent
Ishikawa

(10) Patent No.: US 9,733,431 B2
(45) Date of Patent: Aug. 15, 2017

(54) NOISE REDUCTION DEVICE AND DETECTION APPARATUS INCLUDING SAME

(71) Applicant: CANON KABUSHIKI KAISHA, Tokyo (JP)

(72) Inventor: Michio Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/937,691

(22) Filed: Nov. 10, 2015

(65) Prior Publication Data
US 2016/0147016 A1    May 26, 2016

(30) Foreign Application Priority Data

Nov. 20, 2014   (WO) .................. PCT/JP2014/080763

(51) Int. Cl.
| | | |
|---|---|---|
| *G01J 3/44* | (2006.01) | |
| *G02B 6/28* | (2006.01) | |
| *G02B 6/27* | (2006.01) | |
| *G02B 21/00* | (2006.01) | |
| *H01S 3/00* | (2006.01) | |
| *H01S 3/067* | (2006.01) | |
| *G01J 3/02* | (2006.01) | |

(52) U.S. Cl.
CPC .......... *G02B 6/2861* (2013.01); *G01J 3/0218* (2013.01); *G01J 3/0224* (2013.01); *G01J 3/0262* (2013.01); *G01J 3/44* (2013.01); *G02B 6/2726* (2013.01); *G02B 6/2773* (2013.01); *G02B 21/0084* (2013.01); *H01S 3/0085* (2013.01); *H01S 3/06754* (2013.01)

(58) Field of Classification Search
CPC ................. G01N 21/65; G01N 21/658; G01N 2021/656; G01J 3/44; G01J 3/02
USPC ........................................................ 356/301
See application file for complete search history.

(56) References Cited

U.S. PATENT DOCUMENTS

| | | | | |
|---|---|---|---|---|
| 6,215,224 B1 * | 4/2001 | Kataoka | ................. | H02N 2/142 310/316.02 |
| 2007/0264028 A1 * | 11/2007 | Yuki | .................. | H04B 10/5051 398/183 |
| 2009/0195860 A1 * | 8/2009 | Arahira | ................... | G02F 2/004 359/303 |

(Continued)

FOREIGN PATENT DOCUMENTS

| | | | | |
|---|---|---|---|---|
| JP | WO 2012121357 A1 * | 9/2012 | ............. | G01N 21/65 |
| JP | 2013-113623 A | 6/2013 | | |
| JP | 2014-507627 A | 3/2014 | | |

*Primary Examiner* — Tarifur Chowdhury
*Assistant Examiner* — Md M Rahman
(74) *Attorney, Agent, or Firm* — Canon U.S.A., Inc. IP Division

(57) ABSTRACT

A noise reduction device capable of reducing noise over a wide frequency range and a detection apparatus including the same are provided. The noise reduction device includes a splitting unit configured to split pulsed light generated in a first period into three or more pulsed light beams, a delaying unit configured to provide the three or more pulsed light beams with different delay times, and a combining unit configured to combine the three or more pulsed light beams. Among the three or more pulsed light beams, two pulsed light beams whose delay times provided by the delaying unit are closest to each other are configured such that a difference between their delay times is equal to the first period.

19 Claims, 7 Drawing Sheets

(56) References Cited

U.S. PATENT DOCUMENTS

2010/0145648 A1* 6/2010 Moore .............. G01M 11/3172
                                                        702/89

* cited by examiner

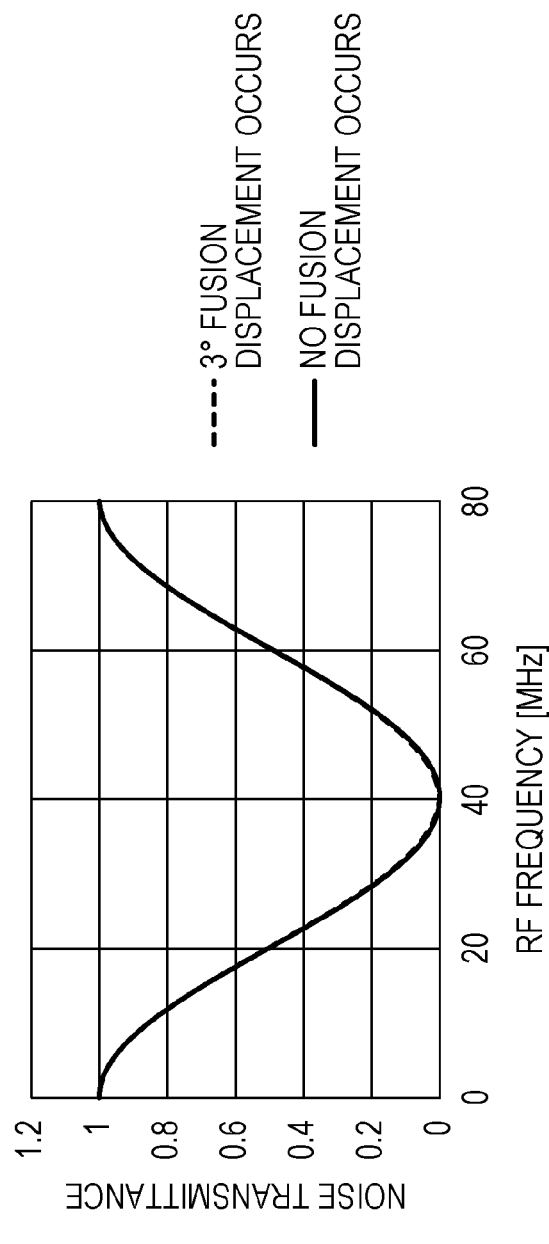
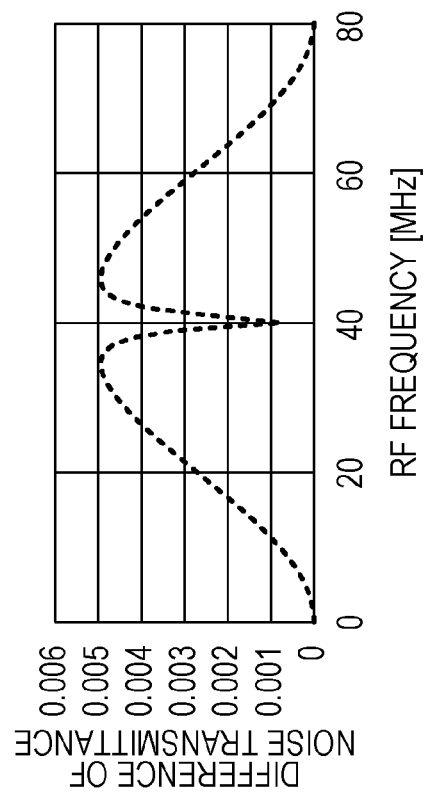
FIG. 5A
FIG. 5B

NOISE REDUCTION DEVICE AND DETECTION APPARATUS INCLUDING SAME

TECHNICAL FIELD

The present invention relates to a noise reduction device used in a detection apparatus employing nonlinear Raman scattering, such as a microscope.

BACKGROUND ART

In recent years, a nonlinear Raman scattering detection apparatus using a nonlinear optical process has been proposed as an apparatus capable of having a detection time shorter than that in a spontaneous Raman scattering detection apparatus. PTL 1 describes a stimulated Raman scattering (SRS) microscope as the nonlinear Raman scattering detection apparatus. This SRS microscope can emit pulsed light beams of two colors having different optical frequencies (wavelengths) to a sample, extract a produced change in pulsed light intensity as an SRS signal by lock-in detection, and thus identify and distinguish molecules included in the sample.

The SRS microscope described in PTL 1 reduces noise in pulsed light intensity by splitting an optical path of one of the pulsed light beams of two colors into two components, providing a time delay to one of the components, and then combining them.

CITATION LIST

Patent Literature

PTL 1 PCT Japanese Translation Patent Publication No. 2014-507627

In measurement of SRS signals at high speeds, a frequency range where the signals are extracted by lock-in detection is wide. However, in the configuration described in PTL 1, the frequency range where it can reduce noise is limited, and it is difficult to sufficiently reduce noise over a wide range.

SUMMARY OF INVENTION

It is an object of the present invention to provide a noise reduction device capable of reducing noise over a wide frequency range and a detection apparatus including the same.

A noise reduction device as one aspect of the present invention to achieve the above object includes a splitting unit, a delaying unit, and a combining unit. The splitting unit is configured to split pulsed light generated in a first period into three or more pulsed light beam. The delaying unit is configured to provide the three or more pulsed light beams with different delay times. The combining unit is configured to combine the three or more pulsed light beams. Among the three or more pulsed light beams, two pulsed light beams whose delay times provided by the delaying unit are closest to each other are configured such that a difference between the delay times is equal to the first period.

Further features of the present invention will become apparent from the following description of exemplary embodiments with reference to the attached drawings.

BRIEF DESCRIPTION OF DRAWINGS

FIGS. 5A and 5B are illustrations for describing influence of fusion displacement according to Example 1 of the present invention.

DESCRIPTION OF EMBODIMENTS

Figure 1:
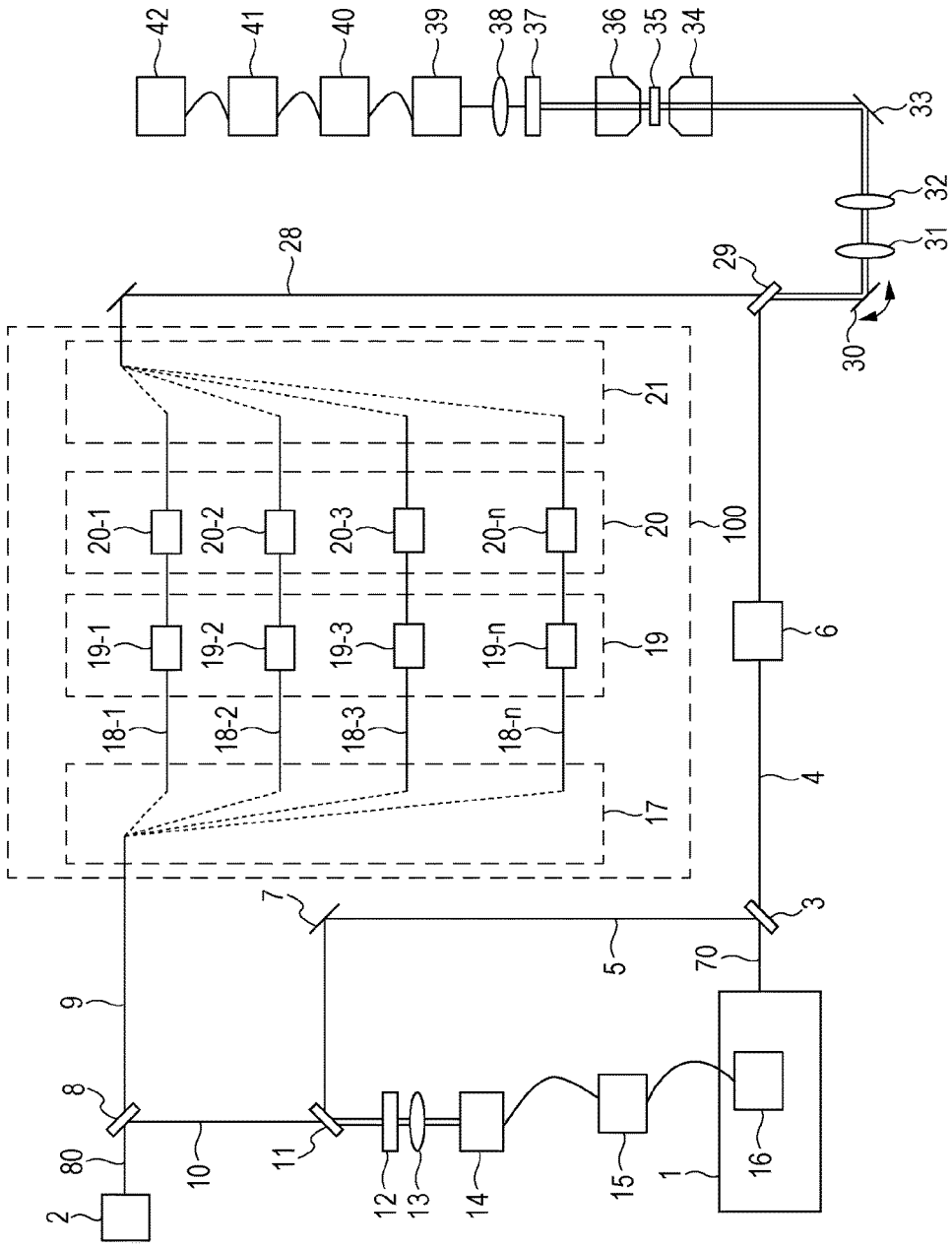
FIG. 1 is a conceptual diagram of a main portion of a nonlinear Raman scattering detection apparatus according to an embodiment of the present invention.

A preferred embodiment of the present invention is described below with reference to the drawings. In the drawings, the same reference numerals are used in the same components, and redundant description is omitted.

FIG. 1 is a conceptual diagram of a main portion of an SRS microscope 50 as a detection apparatus including a noise reduction device 100 according to an embodiment of the present invention. The SRS microscope 50 includes a first generating unit 1 configured to generate first pulsed light 70 having a first optical frequency and a second generating unit 2 configured to generate second pulsed light 80 having a second optical frequency different from the first optical frequency. In the present embodiment, the second optical frequency is higher than the first optical frequency, the first pulsed light 70 is Stokes light, and the second pulsed light 80 is pump light. To increase resolution in measuring a Raman spectrum, each of the pump light and the Stokes light is adjusted such it has a pulse width on the order of picoseconds when it is emitted to a sample.

The first generating unit 1 generates the first pulsed light 70 in a repetition period of 25 ns (repetition frequency: 40 MHz). The second generating unit 2 generates the second pulsed light 80 in a repetition period of 12.5 ns (repetition frequency: 80 MHz). In the present embodiment, the ratio between the repetition period of the first pulsed light 70 and that of the second pulsed light 80 is 2:1 (the repetition frequency ratio is 1:2). In the present embodiment, a pulse laser is used as the light source in each of the first generating unit 1 and the second generating unit 2. When necessary, a configuration in which continuous light emitted from a CW laser is pulsed may also be used. Another configuration in which light from a single light source is split into the first pulsed light 70 and the second pulsed light 80 may also be used.

In the SRS microscope 50, the first pulsed light 70 emitted from the first generating unit 1 is split by a beam splitter 3 into pulsed light beams 4 and 5. An extracting unit 6 is a tunable band-pass filter for extracting a desired frequency range from the pulsed light beam 4. The extracting unit 6 is configured such that an optical frequency to be extracted is selectable and the difference between the optical frequency of pump light and that of Stokes light is changeable by changing the optical frequency to be extracted (extraction wavelength). The pulsed light beam 5 is guided by a mirror 7 to a dichroic mirror 11. The second pulsed light 80 emitted from the second generating unit 2 is split by a beam splitter 8 into pulsed light beams 9 and 10.

The pulsed light beams 5 and 10 are coaxially combined by the dichroic mirror 11, and their polarized light beams are aligned by a polarizing plate 12. The combined pulsed light beams 5 and 10 are converged by a lens 13 and emitted to an optical detector 14 arranged at its focal point such that their spots overlap each other. When the pulsed light beams 5 and 10 are emitted to the optical detector 14 at the same time, a two-photon absorption is caused by a photon included in the pulsed light beam 5 and a photon included in the pulsed light beam 10. The optical detector 14 outputs an electric signal in accordance with a time difference between the time of generating pulsed light by the first generating unit 1 and that by the second generating unit 2 by obtaining a signal based on the two-photon absorption.

In response to the electric signal from the optical detector 14, a feedback circuit 15 provides an output to a cavity length adjusting unit 16 included in the first generating unit 1. In the present embodiment, the cavity length adjusting unit 16 is a piezoelectric actuator and can adjust a repetition frequency of the first pulsed light 70 by changing the cavity length in accordance with the output from the feedback circuit 15. In the optical detector 14, when the time when the pulsed light beam 5 arrives and the time when the pulsed light beam 10 arrives are the same, the electric signals are increased by two-photon absorption. Accordingly, the state where the ratio between the repetition frequency of the pulsed light beam 5 and that of the pulsed light beam 10 is 1:2 can be maintained by smoothing variations in the electric signals output from the optical detector 14 by the feedback circuit 15 and cavity length adjusting unit 16.

The noise reduction device 100 receives the pulsed light beam 9 from the beam splitter 8 and generates a pulsed light beam 28 with reduced noise (details are described below). The pulsed light beams 4 and 28 are coaxially combined by a dichroic mirror 29 and guided to a scanner mirror 30. The scanner mirror 30 is a unit for changing an angle of reflection of pulsed light in biaxial directions. The scanner mirror 30 includes a resonant mirror and a galvano mirror in the present embodiment. Typically, a resonant mirror can change an angle more quickly than a galvano mirror. Thus, in raster-scanning a location where pulsed light is emitted, a resonant mirror may preferably be used for a high-speed axial direction, and a galvano mirror may preferably be used for a low-speed axial direction.

The pulsed light reflected by the scanner mirror 30 passes through lenses 31 and 32. Then the pulsed light beam is deflected by a mirror 33, guided to an objective lens 34, and emitted to a sample 35. The scanner mirror 30 and the entrance pupil of the objective lens 34 are in a conjugated relationship due to the lenses 31 and 32. Thus when the scanner mirror 30 is driven, blocking the pulsed light and changing the amount of light to the sample 35 can be reduced. The focal length of each of the lenses 31 and 32 is adjusted such that the beam size of the pulsed light entering the objective lens 34 and the size of the entrance pupil of the objective lens 34 are equal. The spot size of the pulsed light emitted to the sample 35 can be minimized.

The pulsed light passing through the sample 35 is made to be parallel light by an objective lens 36 and guided to an optical filter 37. The optical filter 37 blocks the pulsed light beam 4, which is Stokes light, and allows only the pulsed light beam 28, which is pump light, to pass therethrough, of the pulsed light passing through the sample 35. The optical filter 37 also blocks light occurring due to a nonlinear optical phenomena other than SRS, such as CARS. The pulsed light beam 28 passing through the optical filter 37 is converged by a lens 38 and guided to an optical detector 39 arranged at its focal point. An electric signal output from the optical detector 39 is amplified by a preamplifier 40 and input into a lock-in amplifier 41. The optical detector 39, preamplifier 40, and lock-in amplifier 41 constitute a detecting unit.

In the SRS microscope 50, when the pump light and Stokes light are emitted to the sample 35 at the same time, if the difference between their optical frequencies is equal to the number of molecular vibrations in the sample 35, SRS occurs in that emission location, the energy of the Stokes light increases, and the energy of the pump light decreases. In the present embodiment, as described above, to efficiently produce and efficiently detect SRS, the ratio between the repetition frequency of the pulsed light beam 4 and that of the pulsed light beam 28 is adjusted to be 1:2. That is, emission of only the pump light to the sample 35 and emission of the pump light and Stokes light to the sample 35 are alternately repeated, and intensity modulation caused by SRS occurs at the repetition frequency of the Stokes light. Accordingly, the intensity of the pulsed light beam 28, which is pump light, is modulated at the repetition frequency of the pulsed light beam 4, which is Stokes light: 40 MHz. By detecting this intensity modulation as an SRS signal (SRS intensity), the molecules included in the sample 35 can be identified or distinguished.

The lock-in amplifier 41 can obtain an SRS signal by extracting electric signals through the preamplifier 40 at 40 MHz by lock-in detection. A calculator 42 receives the SRS signal obtained by the lock-in amplifier 41 and performs processing, such as storing and visualizing. By sweeping the difference between the optical frequency of the pulsed light beam 4 and that of the pulsed light beam 28 by using the extracting unit 6, a change in SRS intensity in accordance with the number of vibrations of molecules included in the sample 35, the change being corresponding to each optical frequency difference, can be obtained as a Raman spectrum. By changing the angle of the scanner mirror 30, a location where the pulsed light is emitted in the sample 35 can be changed and an SRS signal can be detected for each emission location.

Because the SRS intensity as intensity modulation of pump light is significantly small, it is necessary to reduce light intensity noise of the pump light in order to efficiently obtain a Raman spectrum. The details of this are described below.

In the present embodiment, when the intensity of pump light entering a sample is $I_p$ and the intensity of Stokes light entering the sample is $I_s$, the SRS intensity can be expressed as the expression $I_{SRS} = \alpha \chi^{(3)}_{im} I_p I_s$. Here, $\alpha$ is a factor of proportionality, and $\chi^{(3)}_{im}$ is a third-order nonlinear susceptibility of the sample. The intensity I of the pump light scattering through the sample satisfies the following Expression (1).

$$I \propto I_p - I_{SRS} = I_p - \alpha \chi^{(3)}_{im} I_p I_s \qquad (1)$$

For Expression (1), a case where noise is included in pump light and Stokes light is discussed here. First, the intensity of pump light including noise is $I_p = I_{p0} + \Delta I_p$ and the intensity of Stokes light including noise is $I_s = I_{s0} + \Delta I_s$. $I_{p0}$ is a steady component in $I_p$, $\Delta I_p$ is a noise component in $I_p$, $I_{s0}$ is a steady component in IS, and $\Delta I_s$ is a noise component in $I_s$. Here, $\Delta I_p$ and $\Delta I_s$ are first-order minute term sufficiently smaller than $I_p$ and $I_s$. Generally, $I_{SRS}$ (factor of proportionality a) is a minute term that is approximately three to five orders of magnitude smaller than $I_p$ and $I_s$. In consideration of this, when Expression (1) is written to first-order minute terms, the following Expression (2) is derived.

$$I = I_{p0} + \Delta I_p - \alpha \chi^{(3)}{}_{im}(I_{p0} + \Delta I_p)(I_{S0} + \Delta I_S) \qquad (2)$$
$$= I_{p0} + \Delta I_p - \alpha \chi^{(3)}{}_{im} I_{p0} I_{S0}$$

In Expression (2), the term including the noise component $\Delta I_S$ of the Stokes light is a second-order minute term, it can be eliminated. However, the noise component $\Delta I_p$ of the pump light remains. That is, the noise of the pump light contributes to the SRS intensity more largely than the noise of the Stokes light, and it is important to reduce the noise of the pump light. In contrast to the present embodiment, however, if the intensity modulation of the Stokes light is detected as the SRS intensity, this case corresponds to the case where the indices for the pump light and Stokes light are interchanged and the sign of a is reversed in Expressions (1) and (2), and it is important to reduce the noise of the Stokes light.

Next, the noise reduction device 100 according to the present embodiment is described in detail below with reference to FIG. 1. The noise reduction device 100 includes a splitting unit 17, a delaying unit 19, an adjusting unit 20, and a combining unit 21. First, the pulsed light beam 9 entering the noise reduction device 100 is split into n pulsed light beams 18-1 to 18-$n$ by the splitting unit 17. The number n is an integer more than two.

The pulsed light beams 18-1 to 18-$n$ generated by the splitting unit 17 are provided with different delay times by n delaying portions 19-1 to 19-$n$ included in the delaying unit 19, respectively. The optical intensities of the pulsed light beams 18-1 to 18-$n$ are adjusted by n adjusting portions 20-1 to 20-$n$ included in the adjusting unit 20, respectively. The order of providing the delay times to the pulsed light beams 18-1 to 18-$n$ and adjusting the optical intensities may be changed by interchanging the location of the delaying unit 19 and that of the adjusting unit 20.

The pulsed light beams 18-1 to 18-$n$ are coaxially combined by the combining unit 21 and output as the pulsed light beam 28 with reduced noise. Thus, the noise reduction device 100 can satisfactorily reduce the noise of the pump light by splitting the pump light into three or more pulsed light beams, providing different delay times to them, and then combining them. If the intensity modulation of the Stokes light is detected as the SRS intensity, the noise reduction device 100 reduces the noise of the Stokes light.

The principles of how the noise reduction device 100 reduces the noise of the pulsed light are described here. The frequency characteristics of the noise included in the pulsed light can be determined from a spectrum obtained by the Fourier transform of a time waveform of the pulsed light. In the present embodiment, when standardization is performed with the optical power (light intensity) (when the optical powers are assumed to be the same), a spectrum obtained by dividing the spectrum of the pulsed light beam 28 by the spectrum of the pulsed light beam 9 is a noise transmittance spectrum. The noise transmittance spectrum indicates the frequency characteristics of the noise reduction effect by the noise reduction device 100.

The SRS microscope 50 obtains SRS signals by the lock-in amplifier 41 using 40 MHz being the repetition frequency of the Stokes light as the lock-in frequency (using 25 ns being the repetition period of the Stokes light as the lock-in frequency). At this time, the lock-in amplifier 41 extracts electric signals in a frequency range of a specific width whose center is the lock-in frequency. Accordingly, it is desired that noise be reduced in the frequency range where the lock-in amplifier 41 extracts electric signals in the noise transmittance spectrum in the noise reduction device 100. The width of this frequency range is determined by the time constant of the lock-in amplifier 41. In order to perform lock-in detection at high speeds, it is necessary to extract signals in a wide frequency range whose center is 40 MHz.

One example case where SRS signals are obtained by Raster-scanning and 30 images each with 500 pixels in length and 1000 pixels in width are obtained per second is discussed here. In this case, the widthwise direction is assumed to be the high-speed axis scanned with a resonant mirror. When the angle of reflection of pulsed light is changed by the resonant mirror, because the speed of the resonant mirror decreases at both ends of an oscillation angle, an image is distorted at both ends in the widthwise direction, which is the high-speed axial direction in Raster-scanning. To avoid the distortion of the image, 1000 pixels, which is larger than the pixels in the lengthwise direction, are obtained in the widthwise direction, and data at both ends is trimmed such that 500 pixels in the central portion remain. In this way, an image of 500 pixels in length and 500 pixels in width is obtained.

Under the above-described condition, images of 15 million pixels are obtained per second. To extract signals under that condition by the lock-in amplifier 41, it is necessary to have a frequency range of 7.5 MHz, which is half the sampling rate: 15 MHz, from the Nyquist's theorem. That is, it is necessary to set 40±7.5 MHz as the frequency range where the lock-in amplifier 41 extracts signals. In this case, noise in the frequency range of 40±7.5 MHz is superimposed on SRS signals.

From the property of translation in the Fourier transform, when the Fourier transform of the function f(t) is F($\omega$), for any real number $\tau$, the Fourier transform of f(t−$\tau$) is expressed as $e^{i\omega\tau} F(\omega)$. When a delay that is j times $\tau$ (j is an integer) is provided, the Fourier transform can be expressed as $e^{ij\omega\tau} F(\omega)$. Thus, a noise transmittance spectrum N($\omega$) in the noise reduction device 100 can be expressed as the following Expression (3). In Expression (3), $\omega$ indicates the angular frequency of the noise transmittance spectrum, a indicates the light intensity ratio between the pulsed light beams 18-1 to 18-$n$ after they are combined by the combining unit 21, k indicates a value in which one is subtracted from the number of each pulsed light beam (integer between 0 and n−1), and T indicates the repetition period (first period) of the pump light.

$$N(\omega) = \frac{\left| \sum_{j=0}^{n-1} a_j e^{ij\omega T} \right|}{\sum_{k=0}^{n-1} a_k} \qquad (3)$$

For example, a case where n=2 and $a_0=a_1=1$ (light intensity ratio is 1:1), another case where n=3 and $a_0=a_1=a_2=1$ (light intensity ratio is 1:1:1), and still another case where n=3 and $a_0=a_2=1$ and $a_1=2$ (light intensity ratio is 1:2:1) are discussed here. Noise transmittance spectra $N_{11}(\omega)$, $N_{111}(\omega)$, and $N_{121}(\omega)$ in these three cases are expressed as the following Expressions (4), (5), and (6) and indicated by the solid line, broken line, and dotted line in FIG. 2.

$$N_{11}(\omega) = \frac{|1 + e^{j\omega T}|}{2} = \sqrt{\frac{1 + \cos\omega T}{2}} \qquad (4)$$

-continued $$N_{111}(\omega) = \frac{|1 + e^{j\omega T} + e^{2j\omega T}|}{3} \quad (5)$$

$$N_{121}(\omega) = \frac{|1 + 2e^{j\omega T} + e^{2j\omega T}|}{4} = (1 + \cos\omega T)/2 \quad (6)$$

Figure 2:
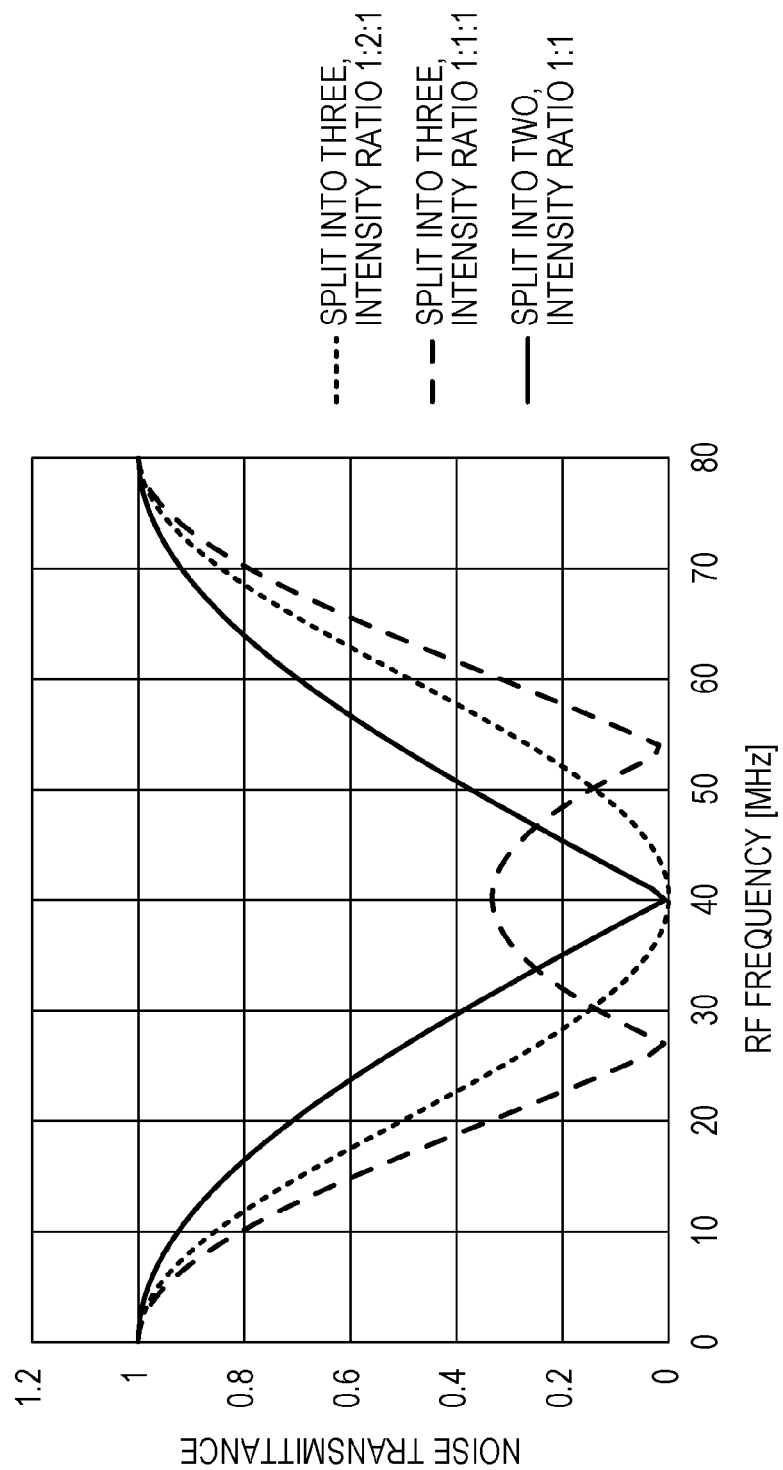
FIG. 2 illustrates a relationship between the number of splits of pulsed light and the light intensity ratio and the noise transmittance.

In the noise transmittance spectrum $N_{11}(\omega)$, which is indicated by the solid line in FIG. 2, when the frequency in the horizontal axis (RF frequency) is 40 MHz, the noise transmittance is reduced to approximately zero, but it increases with increase in the distance from 40 MHz. Thus, the noise included in measured SRS signals increases with increase in the width of the frequency range where the lock-in amplifier 41 extracts signals.

In the noise transmittance spectrum $N_{111}(\omega)$, which is indicated by the broken line in FIG. 2, although the noise transmittance at 40 MHz is not zero, it is low over a frequency range wider than that for the noise transmittance spectrum $N_{11}(\omega)$. Accordingly, when the lock-in amplifier 41 extracts signals in a wide frequency range to extract SRS signals at high speeds, the noise reduction effect when n=3 is larger than that when n=2. In the noise transmittance spectrum $N_{121}(\omega)$, which is indicated by the dotted line in FIG. 2, the characteristic in which the noise transmittance at 40 MHz is approximately zero and the characteristic in which the noise transmittance decreases over a wide frequency range can both be achieved. That is, when n=3, as the light intensity ratio between the three split pulsed light beams, 1:2:1 is preferable to 1:1:1.

When this is generalized, in the case where pulsed light generated in a first period is split into three or more pulsed light beams, among the three or more pulsed light beams, two pulsed light beams whose provided delay times are closest to each other are configured such that the difference between the delay times is the same as the first period. Specifically, when first to nth delay times are provided to the pulsed light beams 18-1 to 18-n, respectively, all of the difference $t_0$ between the first and second delay times, . . . , the difference $t_{n-2}$ between the (n−1)th and nth delay times are set to be the same as the first period T. In this manner, noise can be reduced over a wide frequency range.

Ideally, the following Expression (7) may more preferably be satisfied.

$$t_0 = \ldots = t_{n-2} = T \quad (7)$$

To satisfy Expression (7), in the present embodiment, the first to nth delay times provided to the pulsed light beams 18-1 to 18-n, respectively, are set at kT. That is, the first delay time provided to the pulsed light beam 18-1 is 0T, the second delay time provided to the pulsed light beam 18-2 is 1T, . . . , the nth delay time provided to the pulsed light beam 18-n is (n−1)T. When Expression (7) is satisfied, the delay time may be set at other values. For example, each delay time may be set at kT+α, which is a value displaced by α. In other words, each relative delay time with reference to the shortest time, among the first to nth delay times, may be set at kT.

The cases where "the difference between the delay times is the same as the first period" include a case where the difference between the delay times is not in exact agreement with the first period, that is, a case where Expression (7) is not completely satisfied. For example, if an error of 3 cm occurs in the optical distance (optical path length) in the delaying portion 19-n in the present embodiment, because the time required to convey light in the optical distance 3 cm is approximately 0.1 ns, the nth delay time is displaced by approximately 0.1 ns. Because the first period T is 12.5 ns, an error of the nth delay time is about 1% of the first period and thus can be deemed to be sufficiently small.

The error in the above-described example is exaggeratedly estimated. Arrangement of components in typical optical devices is controlled in the order of a millimeter or less, and actually, the influence of the error in the delay time is even smaller. Accordingly, because the influence of the error in each delay time on the noise transmittance spectrum is sufficiently small, if the difference between the delay times is not in exact agreement with T, the advantages in the present invention are obtainable. Specifically, the following conditional expression (8) may preferably be satisfied. In this case, it can be considered that "the difference between the delay times is the same as the first period."

$$t_k - T < T/6 \quad (8)$$

In addition, to avoid interference between the pulsed light beams 18-1 to 18-n, the delay time may preferably be displaced by the order of a picosecond. The amount of displacement of the difference between the delay times from the first period T may more preferably be smaller than the order of the first period T.

When the light intensity ratio (coefficient $a_k$) between the pulsed light beams 18-1 to 18-n after they are combined by the combining unit 21 is also generalized, the following Expression (9) may preferably be satisfied.

$$a_k = \frac{(n-1)!}{(n-1-k)!k!2^{n-1}} \quad (9)$$

For example, it may be preferable that when n=3, $a_0:a_1:a_2=1:2:1$; when n=4, $a_0:a_1:a_2:a_3=1:3:3:1$; when n=5, $a_0:a_1:a_2:a_3:a_4=1:4:6:4:1$. If the value of the coefficient a is slightly displaced from Expression (9), the advantages in the present invention are obtainable. When Expressions (7) and (9) are substituted into Expression (3), the following Expression (10) is derived.

$$N_n(\omega) = \left| \sum_{k=0}^{n-1} \frac{(n-1)!}{(n-1-k)!k!2^{n-1}} e^{j(k-\frac{n-1}{2})\omega T} \right| \quad (10)$$

$$= \sqrt{\frac{1 + \cos\omega T}{2}}^{n-1}$$

Figure 3:
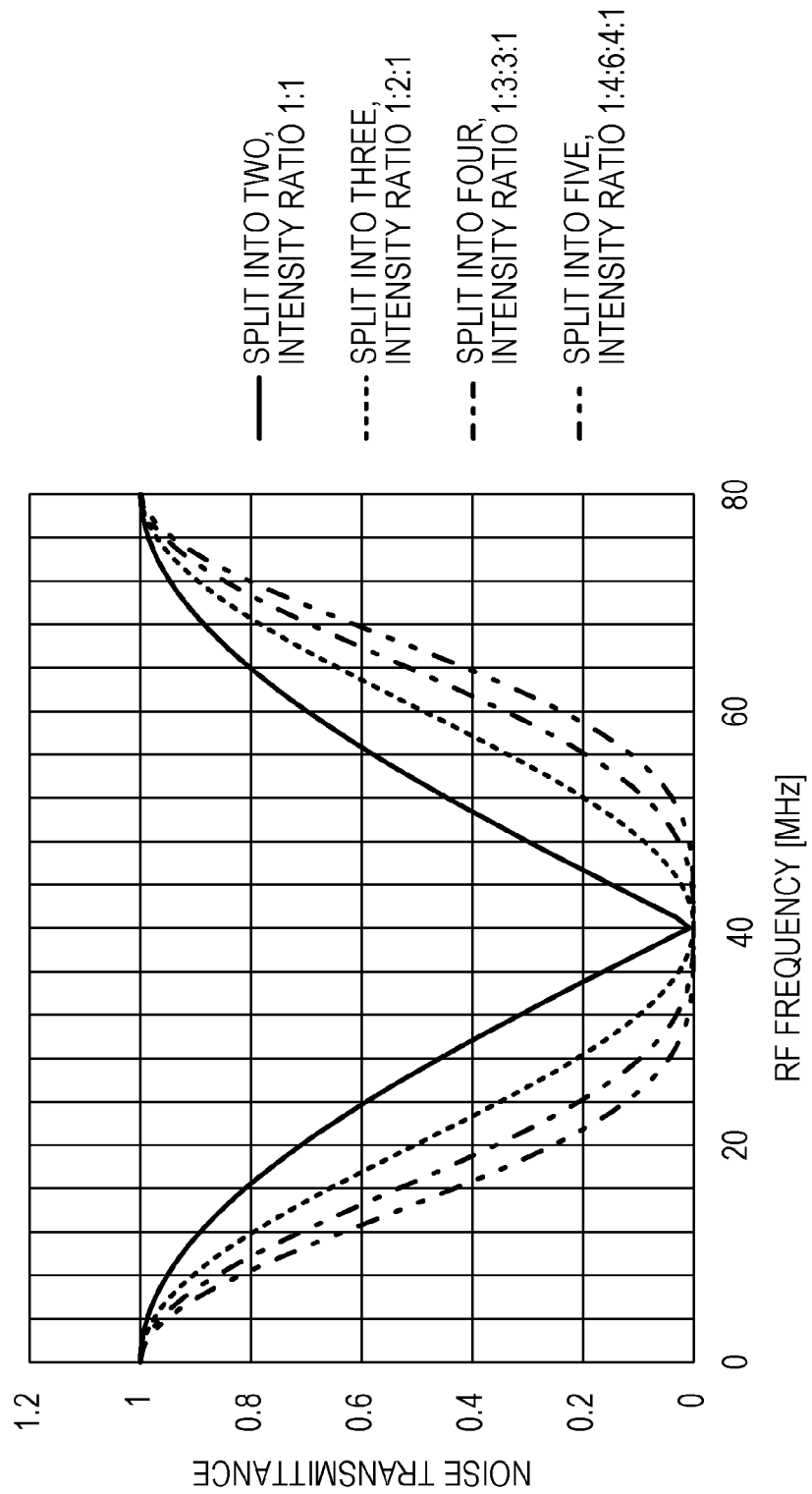
FIG. 3 illustrates noise transmittance spectra according to the embodiment of the present invention.

FIG. 3 illustrates noise transmittance spectra $N_n(\omega)$ when n=2, 3, 4, 5. In FIG. 3, $N_2(\omega)$ is indicated by the solid line, $N_3(\omega)$ is indicated by the dotted line, $N_4(\omega)$ is indicated by the dot-and-dash line, and $N_5(\omega)$ is indicated by the dash-dot-dot line. The noise transmittance spectra $N_2(\omega)$ and $N_3(\omega)$ in FIG. 3 are the same as the noise transmittance spectra $N_{11}(\omega)$ and $N_{121}(\omega)$ in FIG. 2. In FIG. 3, when the frequency in the horizontal axis (RF frequency) is 40 MHz, that is, when $\omega T = \pi$, the noise transmittance spectra $N_n(\omega)$ are approximately zero for n≥2. Because Expression (10) is expressed as a power of a function form smaller than one, as illustrated in FIG. 3, the noise is reduced over a wider frequency range as the value of n increases.

In the noise reduction device 100, at least one of the pulsed light beams 18-1 to 18-n may be further split into a plurality of sub-pulsed light beams. In this case, when the pulse interval between the sub-pulsed light beams is sufficiently smaller than T, because the sub-pulsed light beams can be considered a single pulsed light beam, the advantages in the present invention are obtainable.

As described above, the noise reduction device 100 according to the present embodiment can reduce noise in pulsed light over a wide frequency range.

Example 1

The noise reduction device 100 and the SRS microscope 50 including the same according to Example 1 in the present invention are described in detail below. The configuration in the SRS microscope 50 according to the present example other than the noise reduction device 100 is substantially the same as in the embodiment illustrated in FIG. 1.

In the present example, an ytterbium (Yb)-doped fiber laser is used as the light source in the first generating unit 1, and an erbium (Er)-doped fiber laser is used as the light source in the second generating unit 2. The center wavelength of pulsed light emitted from the Yb-doped fiber laser is 1030 nm, the wavelength width thereof is approximately 30 nm, and this pulsed light is used as the first pulsed light 70. The center wavelength of pulsed light emitted from the Er-doped fiber laser is 1580 nm. The second generating unit 2 mode-locks this pulsed light with a spectrum width of 0.6 nm and then generates a second harmonic by using periodically poled lithium niobate (PPLN). In this way, the second pulsed light 80 whose center wavelength is 790 nm is obtained.

The first pulsed light 70 and second pulsed light 80 are both linearly polarized light. The optical frequency difference therebetween is a value in the range of 2800 to 3100 cm$^{-1}$ in the Raman shift. Thus, SRS signals related to the C—H bond in a molecule included in the sample 35 can be detected.

Figure 4:
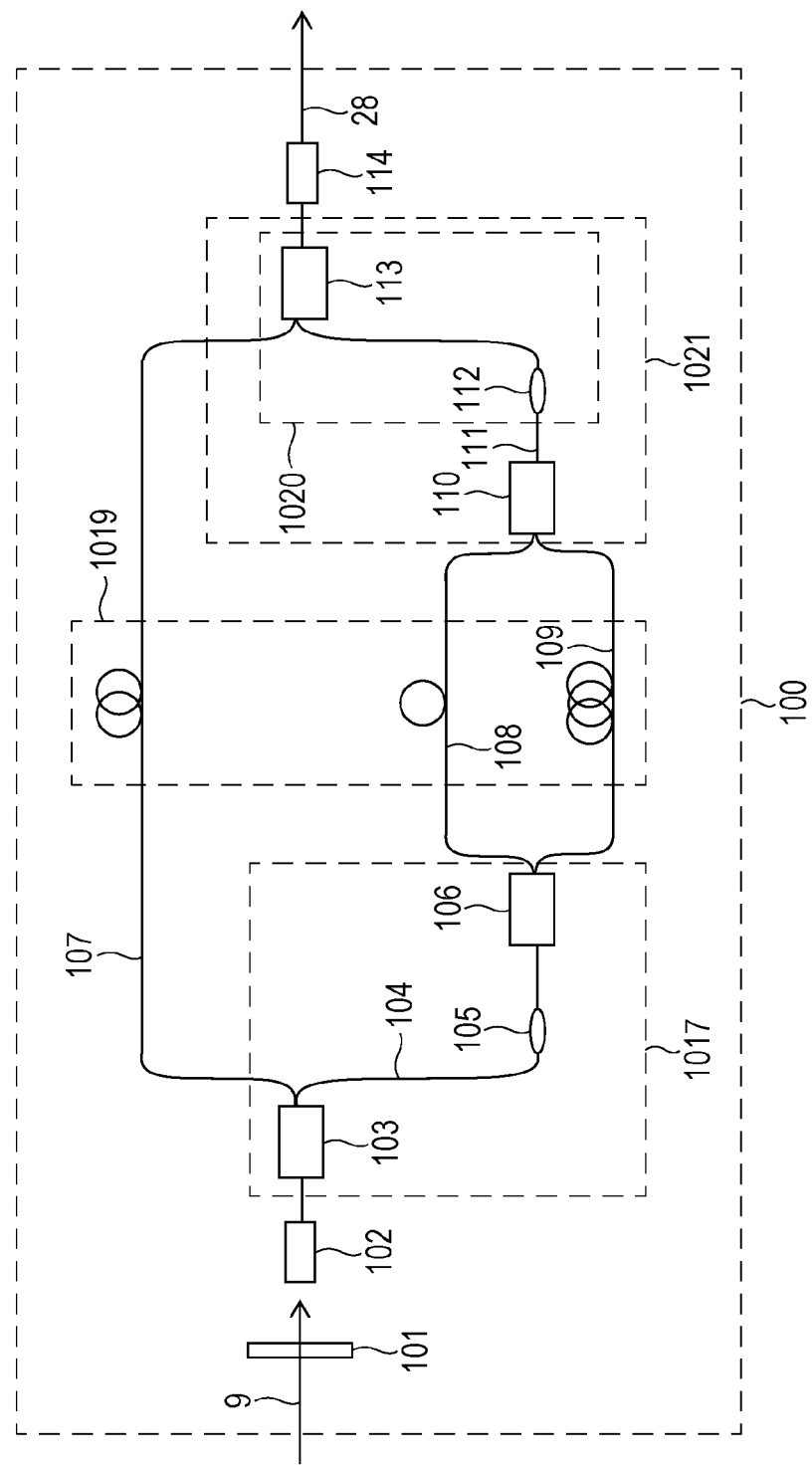
FIG. 4 is a conceptual diagram of a main portion of a noise reduction device according to Embodiment 1 of the present invention.

FIG. 4 is a schematic view of a main portion of the noise reduction device 100 according to the present example. The noise reduction device 100 according to the present example splits the incident pulsed light beam 9 into three pulsed light beams such that the light intensity ratio between the three pulsed light beams is 1:2:1 and combines them to form the pulsed light beam 28. A splitting unit 1017, delaying unit 1019, adjusting unit 1020, and combining unit 1021 in the present example correspond to the splitting unit 17, delaying unit 19, adjusting unit 20, and combining unit 21 in FIG. 1, respectively.

The splitting unit 1017 includes fiber-type polarizing beam splitters (fiber-type PBSs) 103 and 106, a polarization-maintaining optical fiber (PM fiber) 104, and a fused area 105. The delaying unit 1019 includes PM fibers 107, 108, and 109. The combining unit 1021 includes fiber-type PBSs 110 and 113, a PM fiber 111, and a fused area 112. The adjusting unit 1020 includes the fused area 112 and fiber-type PBS 113.

First, the pulsed light beam 9 entering the noise reduction device 100 is guided to the fiber-type PBS 103 through a half-wave plate 101 and a fiber collimator 102. The pulsed light beam 9 is split by the fiber-type PBS 103 into a horizontally polarized component and a vertically polarized component. The half-wave plate 101 rotates the polarization direction of the pulsed light beam 9. By adjusting the angle of the half-wave plate 101, the light intensity ratio between the horizontally and vertically polarized components is set at 1:2. The horizontally polarized component is guided by the PM fiber 107 to the fiber-type PBS 113. The vertically polarized component is guided by the PM fiber 104 to the fiber-type PBS 106.

The PM fiber 104 is configured so as to rotate light such that the difference between the polarization directions before and after the fused area 105 is 45 degrees. The vertically polarized component in the pulsed light guided to the PM fiber 104 is split into light beams by the fiber-type PBS 106 such that the light intensity ratio therebetween is 1:1. One of the split light beams is guided to the PM fiber 108, and the other is guided to the PM fiber 109. When the PM fiber 104 is fused in the fused area 105, even if the rotation angle of the polarization direction slightly deviates from 45 degrees, there is virtually no influence on the noise reduction effect (details will be described below).

The PM fibers 107, 108, and 109 as the delaying portion included in the delaying unit 1019 have different lengths, and each PM fiber provides a split pulsed light beam with a delay time corresponding to its optical distance. In the present example, the length of each PM fiber is adjusted such that with reference to a delay time provided to a pulsed light beam by the PM fiber 108, relative delay times provided to pulsed light beams by the PM fibers 108, 107, and 109 are 0, T, and 2T, respectively. That is, the PM fibers are configured such that the difference between the delay time provided to the pulsed light beam by the PM fiber 108 and that by the PM fiber 107 and the difference between the delay time provided to the pulsed light beam by the PM fiber 107 and that by the PM fiber 109 are both T.

As described above, as needed, each delay time may be shifted, or the difference between the delay times may deviate from T. To reduce fluctuations in pulsed light caused by the nonlinear optical effect occurring inside a PM fiber, the PM fiber may preferably have a minimized length.

The pulsed light beams passing through the PM fibers 108 and 109 are combined by the fiber-type PBS 110 and guided to the PM fiber 111. The PM fiber 111 is configured so as to rotate light such that the difference between the polarization directions before and after the fused area 112 is 45 degrees. Accordingly, the light intensity ratio between the vertically and horizontally polarized components in the pulsed light beam passing through the PM fiber 108 and the light intensity ratio between the vertically and horizontally polarized components in the pulsed light beam passing through the PM fiber 109 can both be 1:1.

The horizontally polarized component in the pulsed light beam guided by the PM fiber 107 and the vertically polarized component in the pulsed light beam guided by the PM fiber 111 are combined by the fiber-type PBS 113 to form the pulsed light beam 28, and the pulsed light beam 28 is ejected from a fiber collimator 114. At this time, the horizontally polarized component in the pulsed light beam guided by the PM fiber 111 is blocked. Accordingly, the light intensity ratio between the pulsed light beams with the provided relative delay times 0, T, and 2T after they are combined by the fiber-type PBS 113 is 1:2:1. Thus, with the noise reduction device 100 according to the present example, the pulsed light beam 28 satisfying the case where n=3 in the above-described Expressions (6) and (10) can be generated.

As described above, in the present example, the light intensity ratio between the pulsed lights is adjusted by adjustment of the fusion angle in the fused area and blocking by the fiber-type PBS as the adjusting unit 1020. At this time, even if the rotation angle of the polarization direction before and after the fused area in the PM fiber deviates from a designed value due to fusion displacement, there is virtually no influence on the noise reduction effect. One example case where the rotation angle of the polarization direction deviates by 3 degrees from 45 degrees is discussed here. In this case, when the light intensity ratio between the light beam guided by the PM fiber 108 and that by the PM fiber 109 deviates by A from 1:1, the following Expression (11) can be derived by rearranging Expression (6).

$$N'_{121}(\omega) = \frac{|1 - \Delta + 2e^{j\omega T} + (1+\Delta)e^{2j\omega T}|}{4} \quad (11)$$

$$= \sqrt{\left(\frac{1+\cos\omega T}{2}\right)^2 + \left(\frac{\Delta \sin\omega T}{2}\right)^2}$$

Here, when the rotation angle deviates by 3 degrees from 45 degrees, $\Delta$ can be expressed by the following Expression (12).

$$\Delta = 1 - 2\{\cos(45° + 3°)\}^2 \quad (12)$$

When Expression (12) is solved, it is found that A is approximately 0.1. FIG. 5A is an illustration in which a noise transmittance spectrum $N'_{121}(\omega)$ obtained by substituting the value of A into Expression (11) is indicated by the broken line and a noise transmittance spectrum $N_{121}(\omega)$ expressed by Expression (6) is indicated by the solid line. FIG. 5B illustrates the difference spectrum between the noise transmittance spectra $N'_{121}(\omega)$ and $N_{121}(\omega)$.

FIG. 5A reveals that both the noise transmittance spectra are substantially the same, and FIG. 5B reveals that the difference of the noise transmittance between a case where fusion displacement occurs and a case where there is no fusion displacement is no more than 0.006 throughout the entire range. Accordingly, even when fusion displacement occurs, a change in noise transmittance spectrum is sufficiently small and thus the advantages in the present invention are obtainable. Typically, with a fiber fusion splicer for fusing a PM fiber, because the rotation angle of the polarization direction can be adjusted with an accuracy of 1 degree or less, an actual change in the noise transmittance spectrum is further small.

Example 2

A noise reduction device 200 and the SRS microscope 50 including the same according to Example 2 in the present invention are described in detail below. The configuration in the SRS microscope 50 according to the present example other than the noise reduction device 200 is substantially the same as in Example 1 described above.

Figure 6:
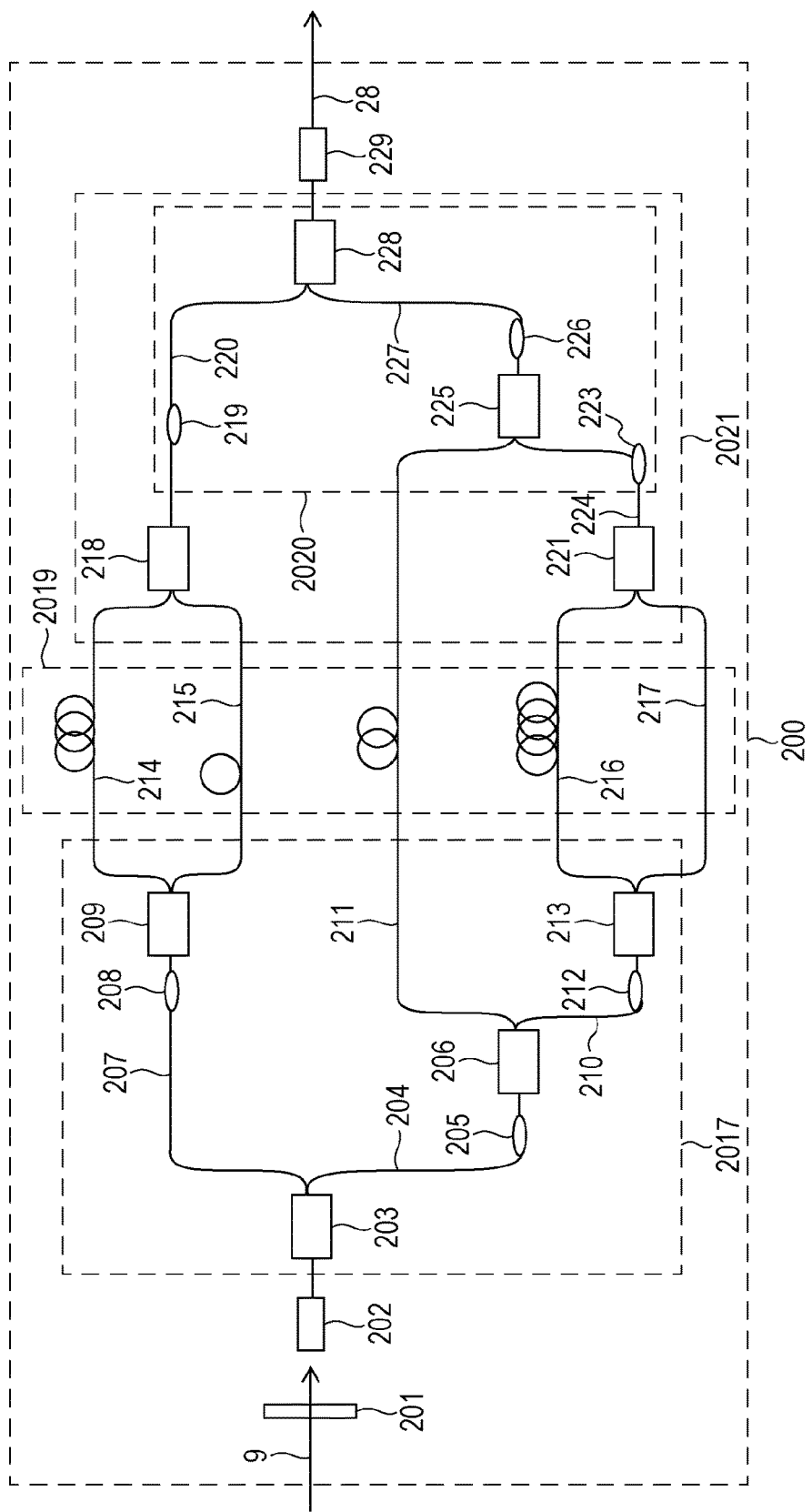
FIG. 6 is a conceptual diagram of a main portion of a noise reduction device according to Example 2 of the present invention.

FIG. 6 is a schematic view of a main portion of the noise reduction device 200 according to the present example. Unlike the noise reduction device 100 according to Example 1, the noise reduction device 200 according to the present example splits the incident pulsed light beam 9 into five pulsed light beams such that the light intensity ratio between the five pulsed light beams is 1:4:6:4:1 and combines them to form the pulsed light beam 28. The noise reduction device 200 according to the present example can reduce noise more than the noise reduction device 100.

A splitting unit 2017, delaying unit 2019, adjusting unit 2020, and combining unit 2021 in the present example correspond to the splitting unit 17, delaying unit 19, adjusting unit 20, and combining unit 21 in FIG. 1, respectively. The splitting unit 2017 includes fiber-type PBSs 203, 206, 209, and 213, PM fibers 204, 207, 210, and 211, and fused areas 205, 208, and 212. The delaying unit 2019 includes PM fibers 211, 214, 215, 216, and 217. The combining unit 2021 includes fiber-type PBSs 218, 221, 225, and 228, fused areas 219, 223, and 226, and PM fibers 220, 224, and 227.

The adjusting unit 2020 includes the fused areas 219, 223, and 226 and the fiber-type PBSs 225 and 228.

First, the pulsed light beam 9 entering the noise reduction device 200 is guided to the fiber-type PBS 203 through a half-wave plate 201 and a fiber collimator 202. The pulsed light beam 9 is split by the fiber-type PBS 203 into a horizontally polarized component and a vertically polarized component. The half-wave plate 201 rotates the polarization direction of the pulsed light beam 9. By adjusting the angle of the half-wave plate 201, the light intensity ratio between the horizontally and vertically polarized components is set at 4:5. The horizontally polarized component is guided to the PM fiber 207, and the vertically polarized component is guided to the PM fiber 204.

The PM fiber 204 is configured so as to rotate light such that the polarization directions before and after the fused area 205 are different. The vertically polarized component in the pulsed light guided to the PM fiber 204 is split into light beams by the fiber-type PBS 206 such that the light intensity ratio therebetween is 2:3. One of the split light beams is guided to the PM fiber 210, and the other is guided to the PM fiber 211. The PM fiber 210 is configured so as to rotate light such that the difference between the polarization directions before and after the fused area 212 is 45 degrees. The pulsed light beam passing through the PM fiber 210 is split into light beams by the fiber-type PBS 213 such that the light intensity ratio therebetween is 1:1. One of the split light beams is guided to the PM fiber 216, and the other is guided to the PM fiber 217.

Similarly, the PM fiber 207 is configured so as to rotate light such that the difference between the polarization directions before and after the fused area 208 is 45 degrees. The pulsed light beam passing through the PM fiber 207 is split into light beams by the fiber-type PBS 209 such that the light intensity ratio therebetween is 1:1. One of the split light beams is guided to the PM fiber 214, and the other is guided to the PM fiber 215.

The PM fibers 217, 215, 211, 214, and 216 as the delaying portion included in the delaying unit 2019 have different lengths. In the present example, the length of each PM fiber is adjusted such that with reference to a delay time provided to a pulsed light beam by the PM fiber 217, relative delay times provided to pulsed light beams by the PM fibers 217, 215, 211, 214, and 216 are 0, T, 2T, 3T, and 4T, respectively. That is, the PM fibers are configured such that, for two PM fibers in which delay times provided to pulsed light beams are closest to each other, the difference between the delay times is T.

The pulsed light beams passing through the PM fibers 214 and 215 are combined by the fiber-type PBS 218 and guided to the PM fiber 220. The PM fiber 220 is configured so as to rotate light such that the difference between the polarization directions before and after the fused area 219 is 45 degrees. Accordingly, the light intensity ratio between the vertically and horizontally polarized components in the pulsed light beam passing through the PM fiber 214 and the light intensity ratio between the vertically and horizontally polarized components in the pulsed light beam passing through the PM fiber 215 can both be 1:1.

The pulsed light beams passing through the PM fibers 216 and 217 are combined by the fiber-type PBS 221 and guided to the PM fiber 224. The PM fiber 224 is configured so as to rotate light such that the difference between the polarization directions before and after the fused area 223 is 45 degrees. The pulsed light beam guided by the PM fiber 211 and the pulsed light beam guided by the PM fiber 224 are combined by the fiber-type PBS 225 and guided to the PM fiber 227.

At this time, the vertically polarized component in the pulsed light beam guided by the PM fiber 224 is blocked by the fiber-type PBS 225. The PM fiber 227 is configured so as to rotate light such that the difference between the polarization directions before and after the fused area 226 is 45 degrees.

The vertically polarized component in the pulsed light beam guided by the PM fiber 220 and the horizontally polarized component in the pulsed light beam guided by the PM fiber 227 are combined by the fiber-type PBS 228 to form the pulsed light beam 28, and the pulsed light beam 28 is ejected from a fiber collimator 229. At this time, the horizontally polarized component in the pulsed light beam guided by the PM fiber 220 and the vertically polarized component in the pulsed light beam guided by the PM fiber 227 are blocked by the fiber-type PBS 228.

In this way, the light intensity ratio between the pulsed light beams with the provided relative delay times 0, T, 2T, 3T, and 4T after they are combined by the fiber-type PBS 228 is 1:4:6:4:1. Thus, with the noise reduction device 200 according to the present example, the noise transmittance spectrum satisfying the case where n=5 in the above-described Expression (10) is obtainable. The noise transmittance spectrum $N_5(\omega)$ according to the example is indicated by the dash-dot-dot line illustrated in FIG. 3. Comparison with the noise transmittance spectrum $N_3(\omega)$ according to Example 1 indicated by the dotted line reveals that the noise is satisfactorily reduced over a wider frequency range.

Example 3

A noise reduction device 300 and the SRS microscope 50 including the same according to Example 3 in the present invention are described in detail below. The configuration in the SRS microscope 50 according to the present example other than the noise reduction device 300 is substantially the same as in Example 1 described above.

Figure 7:
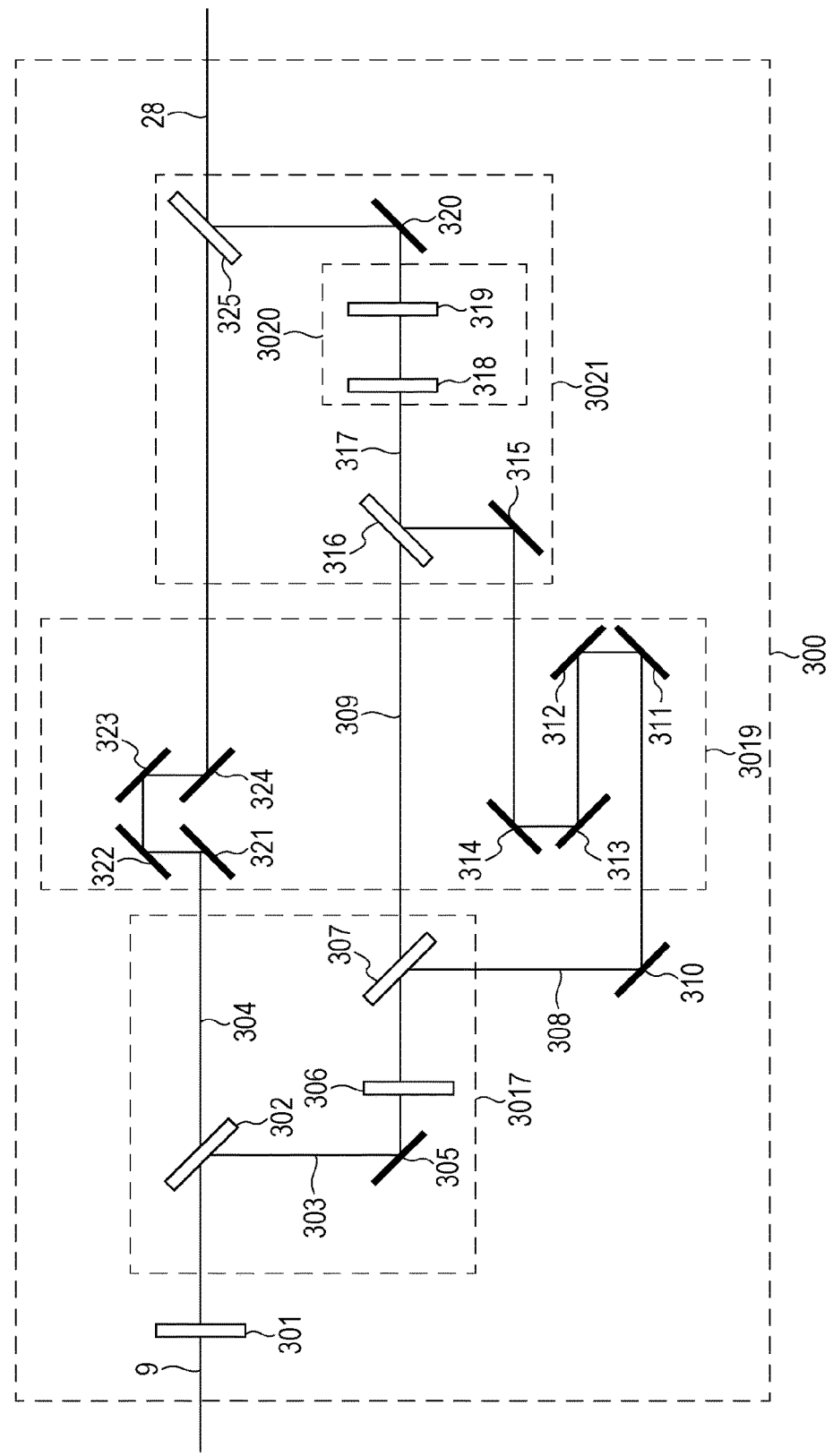
FIG. 7 is a conceptual diagram of a main portion of a noise reduction device according to Example 3 of the present invention.

FIG. 7 is a schematic view of a main portion of the noise reduction device 300 according to the present example. The noise reduction device 300 according to the present example includes an optical system equivalent to that in the noise reduction device 100 according to Example 1 without using optical fibers. A splitting unit 3017, delaying unit 3019, adjusting unit 3020, and combining unit 3021 in the present example correspond to the splitting unit 17, delaying unit 19, adjusting unit 20, and combining unit 21 in FIG. 1, respectively.

The splitting unit 3017 includes polarizing beam splitters (PBSs) 302 and 307, mirror 305, and a half-wave plate 306. The delaying unit 3019 includes mirrors 311, 312, 313, 314, 321, 322, 323, and 324. The combining unit 3021 includes mirrors 315 and 320, PBSs 316 and 325, a half-wave plate 318, and a polarizing plate 319. The adjusting unit 3020 includes the half-wave plate 318 and the polarizing plate 319.

First, the pulsed light beam 9 entering the noise reduction device 300 is guided to the PBS 302 through a half-wave plate 301. The pulsed light beam 9 is split by the PBS 302 into pulsed light beams 303 and 304. The half-wave plate 301 rotates the polarization direction of the pulsed light beam 9. By adjusting the angle of the half-wave plate 301, the light intensity ratio between the pulsed light beams 303 and 304 is set at 1:1. The pulsed light beam 303 is guided to the half-wave plate 306 by the mirror 305. The polarization direction of the pulsed light beam 303 is rotated by the half-wave plate 306. The pulsed light beam 303 passing through the half-wave plate 306 is split by the PBS 307 into pulsed light beams 308 and 309. The light intensity ratio between the pulsed light beams 308 and 309 can be adjusted by rotating the half-wave plate 306.

The delaying unit 3019 includes a first relay optical system as the delaying portion including the mirrors 311, 312, 313, and 314 and a second relay optical system as the delay portion including the mirrors 321, 322, 323, and 324. The delaying unit 3019 provides the pulsed light beams 304, 308, and 309 with delay times corresponding to the optical distances of the first and second relay optical systems.

In Example 3, the optical distance (optical path length) of each of the first and second relay optical systems is adjusted such that with reference to a delay time provided to the pulsed light beam 309, relative delay times provided to the pulsed light beams 309, 304, and 308 are 0, T, and 2T, respectively. That is, the relay optical systems are configured such that the difference between the delay times provided to the pulsed light beams 308 and 309 by the first relay optical system and the difference between the delay times provided to the pulsed light beams 304 and 309 by the second relay optical system are both T.

The pulsed light beam 308 guided by the mirror 315 and the pulsed light beam 309 are combined by the PBS 316 and ejected as a pulsed light beam 317. At this time, the pulsed light beams 308 and 309 are combined in the state where their polarization directions are perpendicular to each other. The pulsed light beam 317 is guided to the mirror 320 through the half-wave plate 318 and the polarizing plate 319. The half-wave plate 318 rotates the polarization direction of the pulsed light beam 317. The polarizing plate 319 reduces the light intensity in accordance with the polarization direction of the pulsed light beam 317.

By adjusting the angles of the half-wave plates 306 and 318, the light intensity ratio between the component whose provided relative delay time is 0 and the component whose provided relative delay time is 2T in the pulsed light beam 317 passing through the polarizing plate 319 can be adjusted. In the present example, the polarization direction of the half-wave plate 306 is adjusted such that the light intensity ratio between the pulsed light beams 308 and 309 is 1:1, and the transmission direction of the polarizing plate 319 is set at an angle where it forms 45 degrees to each of the two perpendicular polarized components included in the pulsed light beam 317.

The pulsed light beam 304 guided by the second relay optical system and the pulsed light beam 317 guided by the mirror 320 are combined by the PBS 325 and ejected as the pulsed light beam 28. In this way, the light intensity ratio between the pulsed light beams with the provided relative delay times 0, T, and 2T after they are combined by the PBS 325 is 1:2:1. Thus, with the noise reduction device 300 according to the present example, the pulsed light beam 28 satisfying the case where n=3 in the above-described Expressions (6) and (10) can be generated. In addition, because no optical fibers are used in the noise reduction device 300, deformation of pulsed light caused by the nonlinear optical effect occurring inside optical fibers can be suppressed.

VARIATIONS

The present invention is not limited to the preferred embodiment and examples in the present invention described above. Various combinations, modifications, and changes can be made within the scope.

In the present embodiment, the case where a noise reduction device is disposed in an SRS microscope as a nonlinear Raman scattering detection apparatus is described. Other forms may also be used. The noise reduction device according to the embodiment is suited for any detection apparatuses for detecting intensity modulation of pulsed light. For example, the noise reduction device according to the present embodiment may be used in a nonlinear Raman scattering detection apparatus such as a nonlinear Raman scattering microscope that employs nonlinear Raman scattering other than stimulated Raman scattering or a nonlinear Raman scattering endoscope.

The detection apparatus according to the embodiment is configured such that the repetition period in the first generating unit is twice the repetition period in the second generating unit (such that repetition frequency in the first generating unit is half the repetition frequency in the second generating unit). Other forms may also be used. At least, the detection apparatus is configured such that repetition period in the first generating unit may be an integral multiple of the repetition period in the second generating unit (such that the repetition frequency in the first generating unit is an integral submultiple of the repetition frequency in the second generating unit). In this case, the repetition period in the first generating unit is an integral multiple of the repetition period in the second generating unit such that the difference between the delay times provided by the delaying unit is the same as half a period where reducing noise is required, that is, a period where intensity modulation of pulsed light occurs (repetition period in the first generating unit).

According to the present invention, a noise reduction device capable of reducing noise over a wide frequency range and a detection apparatus including the same can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2014/080763, filed Nov. 20, 2014, which is hereby incorporated by reference herein in its entirety.

What is claimed is:

1. A noise reduction device comprising:
a splitting unit configured to split pulsed light generated in a first period into three or more pulsed light beams;
a delaying unit configured to provide the three or more pulsed light beams with different delay times; and
a combining unit configured to combine the three or more pulsed light beams,
wherein among the three or more pulsed light beams, two pulsed light beams whose delay times provided by the delaying unit are closest to each other are configured such that the following expression is satisfied:

$$t_k - T < T/6$$

where $t_k$ is a difference between their delay times and T is the first period.

2. The noise reduction device according to claim 1, wherein the splitting unit splits the pulsed light into first, second, . . . , nth pulsed light beams, n being an integer greater than two, and the following expression is satisfied:

$$a_k = \frac{(n-1)!}{(n-1-k)!\,k!\,2^{n-1}}$$

where $a_k$ is a light intensity ratio between the first, second, . . . , nth pulsed light beams after they are combined by the combining unit, k is an integer between 0 and n−1).

3. The noise reduction device according to claim 1, wherein the splitting unit splits the pulsed light into first, second, . . . , nth pulsed light beams, n being an integer greater than two, the delaying unit provides the first, second, . . . , nth pulsed light beams with first, second, . . . , nth delay times, respectively, and the following expression is satisfied:

$$t_0 = \ldots = t_{n-2} = T$$

where $t_0$ is a difference between the first and second delay times and $t_{n-2}$ is a difference between the (n−1)th and nth delay times.

4. The noise reduction device according to claim 1, wherein the splitting unit splits the pulsed light into first, second, . . . , nth pulsed light beams, n being an integer greater than two, the delaying unit provides the first, second, . . . , nth pulsed light beams with first, second, . . . , nth relative delay times, respectively, with reference to the delay time provided to the first pulsed light beam, and when the first period is T, the first, second, . . . , nth relative delay times are 0, T, . . . (n−1)T, respectively.

5. The noise reduction device according to claim 1, wherein the delaying unit includes an optical fiber forming three or more optical paths corresponding to the three or more pulsed light beams, respectively, and the three or more optical paths have different optical distances.

6. The noise reduction device according to claim 1, further comprising an adjusting unit configured to adjust a light intensity of each of the three or more pulsed light beams.

7. The noise reduction device according to claim 6, further comprising an optical fiber configured to guide each of the three or more pulsed light beams,
wherein the adjusting unit includes a fused area where the optical fiber is fused such that polarization directions of the pulsed light before and after the fused area are different.

8. The noise reduction device according to claim 7, wherein the optical fiber is a polarization-maintaining optical fiber.

9. The noise reduction device according to claim 6, further comprising an optical fiber configured to guide each of the three or more pulsed light beams,
wherein the adjusting unit includes a fiber-type polarizing beam splitter configured to receive the pulsed light beam guided by the optical fiber.

10. A detection apparatus comprising:
the noise reduction device according to claim 1; and
a generating unit configured to generate the pulsed light in the first period.

11. The detection apparatus according to claim 10, further comprising:
a first generating unit configured to generate pulsed light;
a second generating unit configured to generate pulsed light having an optical frequency different from that of the pulsed light generated by the first generating unit; and
a detecting unit configured to detect light whose intensity is modulated by emitting the pulsed light generated by the first generating unit and the pulsed light generated by the second generating unit and passing through the noise reduction device to a sample.

12. The detection apparatus according to claim 11, wherein the first generating unit generates the pulsed light in a period that is an integral multiple of the first period.

13. The detection apparatus according to claim 11, wherein the detecting unit includes a lock-in amplifier configured to perform lock-in detection using a repetition period of the pulsed light generated by the first generating unit as a lock-in period.

14. The detection apparatus according to claim 13, wherein the detecting unit detects light whose intensity is modulated by stimulated Raman scattering caused by emitting the pulsed light generated by the first generating unit and the pulsed light generated by the second generating unit and passing through the noise reduction device to the sample.

15. The detection apparatus according to claim 11, further comprising an extracting unit configured to change an optical frequency of light extracted from the pulsed light generated by the first generating unit.

16. The detection apparatus according to claim 15, wherein the intensity-modulated light is detected for each optical frequency extracted by the extracting unit.

17. A detection apparatus comprising:
   first and second generating units configured to generate pulsed light;
   a noise reduction device including a splitting unit configured to split the pulsed light generated by the second generating unit into three or more pulsed light beams, a delaying unit configured to provide the three or more pulsed light beams with different delay times, and a combining unit configured to combine the three or more pulsed light beams; and
   a detecting unit configured to detect light intensity modulation caused by emitting the pulsed light generated by the first generating unit and the pulsed light generated by the second generating unit and passing through the noise reduction device to a sample,
   wherein among the three or more pulsed light beams, two pulsed light beams whose delay times provided by the delaying unit are closest to each other are configured such that the following expression is satisfied:

$t_k - T < T/6$ where $t_k$ is a difference between their delay times and T is half a period where the intensity modulation occurs.

18. The detection apparatus according to claim 17, wherein the first generating unit generates the pulsed light in a first period, the second generating unit generates the pulsed light in a second period shorter than the first period, and the intensity modulation occurs in the first period.

19. A noise reduction method comprising:
   splitting pulsed light generated in a first period into three or more pulsed light beams;
   providing the three or more pulsed light beams with different delay times; and
   combining the three or more pulsed light beams,
   wherein among the three or more pulsed light beams, two pulsed light beams whose delay times provided in the providing step are closest to each other are configured such that the following expression is satisfied:

$t_k - T < T/6$ where $t_k$ is a difference between their delay times and T is the first period.

* * * * *